UNITED STATES PATENT OFFICE.

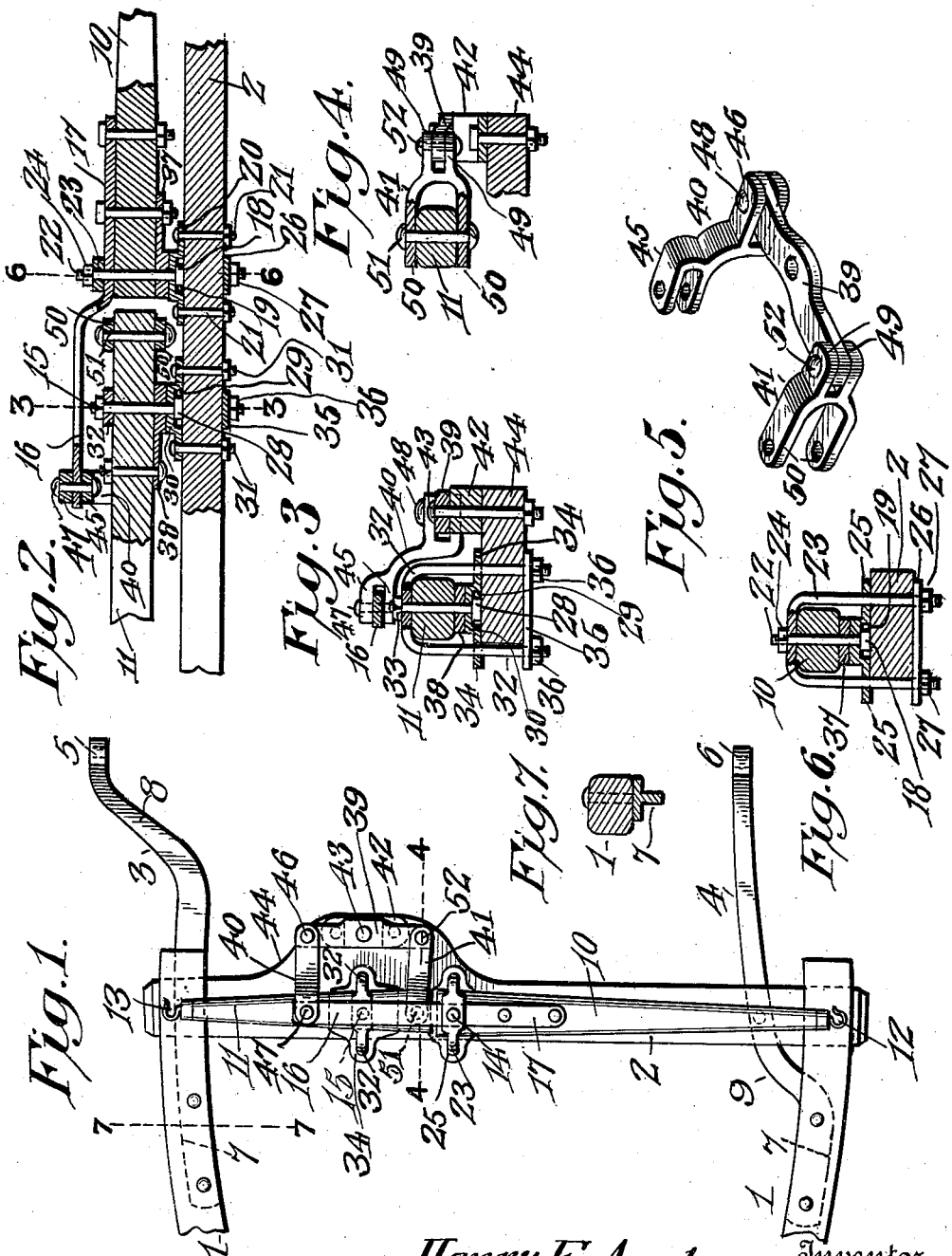

HENRY E. AASTROM, OF NICOLLET, MINNESOTA.

DRAFT-EQUALIZER.

988,161.

Specification of Letters Patent. Patented Mar. 28, 1911.

Application filed December 7, 1909. Serial No. 531,820.

*To all whom it may concern:*

Be it known that I, HENRY E. AASTROM, a citizen of the United States, residing at Nicollet, in the county of Nicollet and State of Minnesota, have invented a new and useful Draft-Equalizer, of which the following is a specification.

The invention relates to improvements in draft equalizers.

The object of the present invention is to improve the construction of draft equalizers, and to provide a simple, inexpensive and efficient device, designed for use on buggies and other vehicles, and adapted to off-set the shafts from their usual central position to one side of the same to permit a horse to travel in the left hand track, and capable of arranging the swingletree within the contour of the shafts with the pivotal connections approximately in line with the center of the vehicle and without producing an unequal strain at the ends of the swingletree.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a plan view of a draft equalizer, constructed in accordance with this invention. Fig. 2 is a sectional view, taken longitudinally of the swingletree sections. Fig. 3 is a vertical sectional view on the line 3—3 of Fig. 2. Fig. 4 is a detail sectional view on the line 4—4 of Fig. 1. Fig. 5 is a detail view of the rear lever and the links for connecting the inner ends of the swingletree sections. Fig. 6 is a vertical sectional view on the line 6—6 of Fig. 2. Fig. 7 is a detail sectional view on the line 7—7 of Fig. 1.

Like numerals of reference designate corresponding parts in all the figures of the drawing.

1—1 designate a pair of shafts or thills connected by a cross bar 2, and off-set from the center of a buggy or other vehicle by means of thill irons 3 and 4, terminating in eyes 5 and 6 and adapted to be coupled to the axle of a buggy, or other vehicle (not shown) by thill couplings of the ordinary construction. The thill irons have front attaching portions and are preferably reinforced at their lower faces by a longitudinal rib 7. The thill iron 3 is provided in rear of the cross bar 2 with a laterally extending angularly disposed portion 8, and the rear portion of the thill iron 3 is arranged at an angle to the laterally extending portion 8, and is disposed in a direction longitudinally of the buggy to enable it to fit between the coupling ears (not shown) of a vehicle. The other thill iron 4 is provided adjacent to the cross bar 2 with a lateral bend 9, and it forms a brace for the said cross bar 2, and its rear portion is arranged at a slight angle, as clearly shown in Fig. 1 of the drawings. This construction of the thill irons off-sets the shafts to the left of the positions usually occupied by the shafts of a buggy, or other vehicle, so that a horse will be permitted to walk in the left hand track made in a road.

In order to enable the wheels of the vehicle to run in the tracks made by vehicles, an equalizing device is employed. This equalizing device comprises swingletree sections 10 and 11, extending longitudinally of and arranged upon the cross bar 2 and having trace receiving outer terminals 12 and 13, and pivoted at intermediate points by vertical bolts 14 and 15 to form levers. The outer terminals of the swingletree sections are designed in practice to be equipped with trace hooks, or other fastening means, and the swingletree section 10, which is located at the left hand side of the cross bar 2, is of greater length than the swingletree section 11 and is provided with an arm 16, which overlaps the short swingletree section 11. The swingletree sections 10 and 11 are preferably constructed of wood, and the arm 16 consists of a metallic bar or piece having an attaching portion 17, secured to the upper face of the wooden body portion of the swingletree section 10.

The pivot 14 consists of a bolt, provided at its lower end with a head 18, arranged in a recess 19 in the lower face of a bearing plate 20, which is secured by bolts 21 to the cross bar 2. The upper end 22 of the pivot bolt 14 extends through a perforation of a yoke 23, and it may be threaded to receive a nut 24, but the nut may be omitted if desired. The yoke 23, which is approximately U-shaped, as clearly shown in Fig. 6 of the drawing, extends through opposite ears 25 of the bearing plate 20, and the lower terminals of the sides of the yoke pierce a bottom clip plate 26 and are threaded for the reception of nuts 27. The other pivot 15 also consists of an inverted bolt, having a head 28 at its lower end, arranged in a recess 29 in the lower face of a bearing plate 30, which is secured by bolts 31, or other suitable fastening devices to the upper face of the cross bar 2, as clearly shown in Fig. 2 of the drawing. The upper end of the pivot pierces the top of a yoke 32 and is threaded for the reception of a nut 33, which may be omitted if desired. The yoke 32, which is U-shaped, extends through ears 34 of the bearing plate 30, and its lower ends pierce a bottom clip 35 and are threaded for the reception of nuts 36. The swingletree sections are also equipped with upper bearing plates 37 and 38, fitted against the lower faces of said swingletree sections and having openings for the pivots 14 and 15 and provided with outwardly extending attaching portions, secured to the swingletree sections by bolts or other suitable fastening means.

The inner ends of the swingletree sections are connected by a rear horizontally disposed lever 39 and links 40 and 41. The lever 39 is centrally mounted on a bracket or support 42, having a pivot 43 and secured to an enlargement 44 of the cross bar 2 of the thills. The link 40, which is arranged at an inclination, has its front and rear portions 45 and 46 bifurcated and secured by pivots 47 and 48 to the metallic arm of the swingletree section 10 and to the adjacent arm of the rear lever 39. The other link 41 has a rear bifurcated portion 49 and is provided at the front portion with spaced arms 50, and it is connected by front and rear pivots 51 and 52 with the inner end of the swingletree section 11 and the adjacent end of the rear connecting lever 39. The metallic arm of the swingletree section 10, which overlaps the swingletree section 11, is bent upwardly at the inner end thereof to clear the link 41 and to arrange it in the plane of the front bifurcation of the link 40, and it extends longitudinally of the shorter section beyond the pivot thereof. The inner arm 16 of the swingletree section 10 is relatively short compared with the outer arm thereof, and the inner arm of the swingletree section 11 is shorter than the outer arm of the same. The rear lever and the links connect the swingletree sections, and cause the outer portions of the same to move in opposite directions. When the outer end of the swingletree section 10 moves forwardly the corresponding end of the section 11 is carried rearwardly, motion being transmitted from one swingletree section to the said connecting means.

Having thus fully described my invention, what I claim as new and desire to secure by Letters Patent, is:—

1. In combination with a pair of shafts having a cross bar and provided with offset thill irons, a divided swingletree arranged on the said cross bar within the contour of the shafts and composed of two oppositely movable sections pivoted at spaced points intermediate of the ends of and to the cross bar, the pivots of both sections being arranged at one side of the center of the cross bar, and equalizing devices connecting the ends of the sections of the swingletree to cause them to move simultaneously in opposite directions.

2. In combination with a pair of shafts having a cross bar and provided with offset thill irons, a divided swingletree arranged on the cross bar and composed of two sections of unequal length, both arranged in the same horizontal plane and each pivoted independently to the cross bar at one side of the center thereof, a bar secured to the inner end of the long section of the swingletree and extending over the short section, and a lever also carried by and pivoted to the cross bar in rear of the swingletree and connected with the short section of the swingletree and with the bar of the long section.

3. In combination with a pair of shafts having a cross bar and provided with off-set thill irons, a divided swingletree arranged on the cross bar and composed of two sections of unequal length disposed in the same horizontal plane and each pivoted independently of the cross bar at one side of the center thereof, a bar secured to the inner end of the long section of the swingletree and extending over the short section, upper and lower bearing plates, the upper bearing plates being secured to the swingletree sections and the lower bearing plates being provided in their lower faces with recesses, pivot bolts for the swingletree sections having their heads located in the said recesses, said bolts extending through the bearing plates and through the said sections, yokes straddling the swingletree sections and securing the lower bearing plates to the cross bar and provided in their tops with openings receiving the upper ends of the said pivot bolts, and a lever also carried by and pivoted to the cross bar in rear of the swingletree and connected with the short section of the swingletree and with the bar of the long section.

In testimony, that I claim the foregoing as my own, I have hereto affixed my signature in the presence of two witnesses.

HENRY E. AASTROM.

Witnesses:
 ED. H. OLSON,
 E. W. CUSSICK.

Copies of this patent may be obtained for five cents each, by addressing the "Commissioner of Patents, Washington, D. C."